(12) United States Patent
Saitou et al.

(10) Patent No.: US 7,476,091 B2
(45) Date of Patent: Jan. 13, 2009

(54) POWER BLOWER

(75) Inventors: Akito Saitou, Wako (JP); Jun Ito, Wako (JP); Koichi Hirakawa, Okayama (JP)

(73) Assignee: Honda Motor Co., Ltd. (JP)

( * ) Notice: Subject to any disclaimer, the term of this patent is extended or adjusted under 35 U.S.C. 154(b) by 447 days.

(21) Appl. No.: 10/980,386

(22) Filed: Nov. 3, 2004

(65) Prior Publication Data
US 2005/0123410 A1 Jun. 9, 2005

(30) Foreign Application Priority Data
Dec. 5, 2003 (JP) ............... 2003-407938

(51) Int. Cl.
F04B 17/00 (2006.01)
F04B 35/04 (2006.01)
(52) U.S. Cl. ............. 417/423.1; 417/423.9; 417/423.15
(58) Field of Classification Search ............. 417/423.1, 417/423.9, 423.15; 15/330; D08/2
See application file for complete search history.

(56) References Cited
U.S. PATENT DOCUMENTS 4,325,163 A * 4/1982 Mattson et al. ............... 15/330
4,644,606 A * 2/1987 Luerken et al. ............... 15/330
4,674,146 A * 6/1987 Tuggle et al. ................ 15/330
4,870,714 A * 10/1989 Miner ........................ 15/327.5
6,305,909 B1 * 10/2001 Jankowski et al. .......... 417/234
6,552,891 B1 * 4/2003 Prach ........................ 361/212
6,640,384 B2 * 11/2003 Sanders et al. ............... 15/330

FOREIGN PATENT DOCUMENTS
JP          02120511           9/1990

* cited by examiner

Primary Examiner—Devon C Kramer
Assistant Examiner—Patrick Hamo
(74) Attorney, Agent, or Firm—Adams & Wilks

(57) ABSTRACT

A power blower has a body having a fan housing for accommodating a fan, the fan housing having an upper portion, a lower portion opposite to the upper portion, and a pair of support portions extending from the upper portion. A driving machine is mounted to the fan housing for driving the fan. A discharge duct is mounted to the fan housing for discharging a current of air produced by driving of the fan. A pair of legs is disposed at the lower portion of the fan housing to enable the body to stand alone on a surface. A main handle having a structure separate and independent from the fan housing is removably connected to the pair of support portions of the fan housing. An auxiliary handle is integrally formed with and disposed between the pair of legs. The auxiliary handle has a holding edge aligned with a central extension line of the main handle.

15 Claims, 10 Drawing Sheets

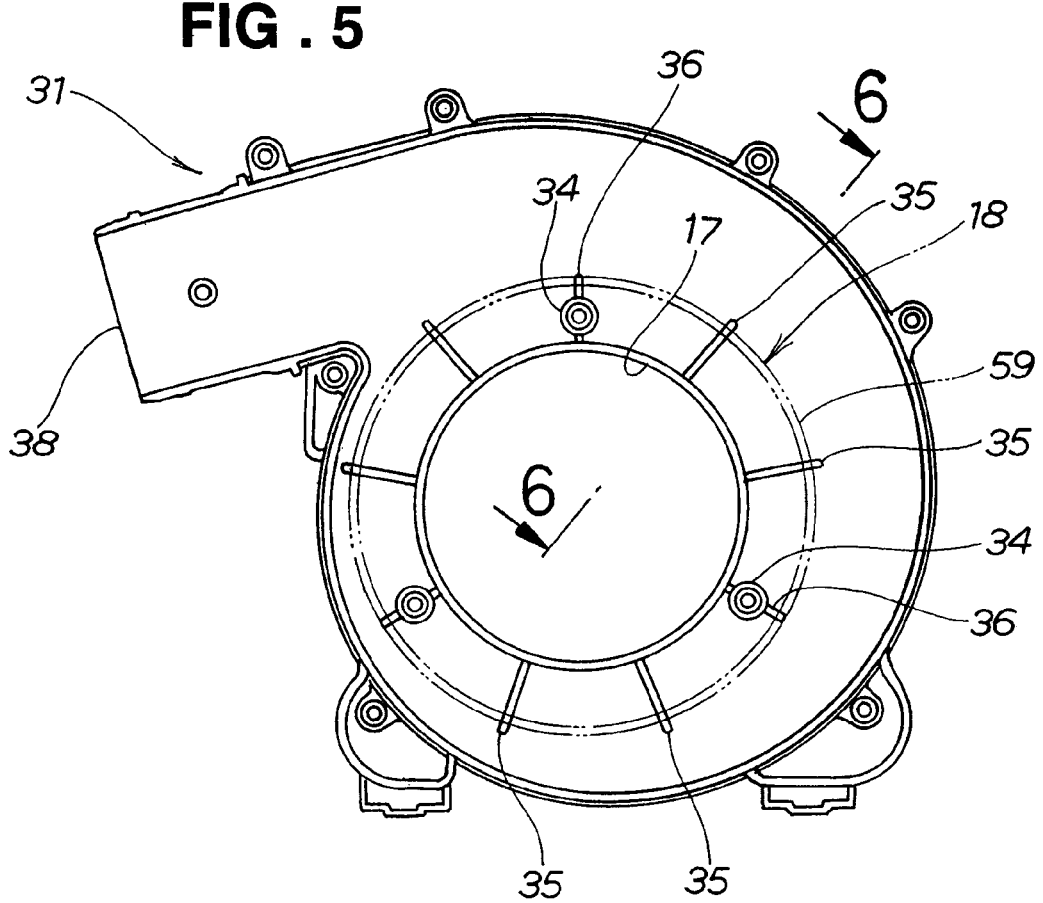
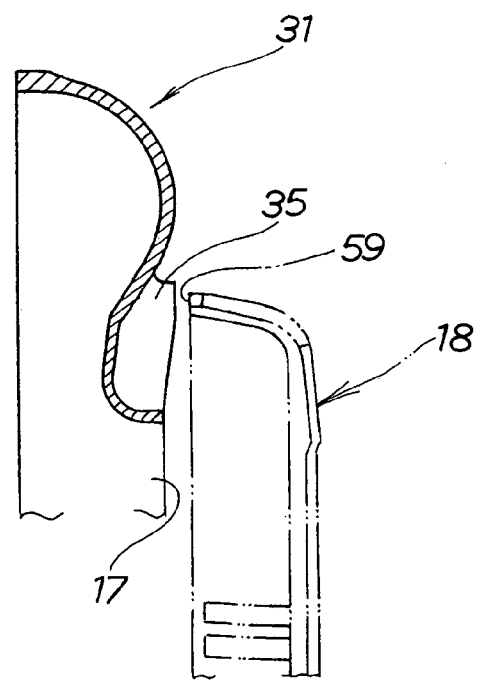

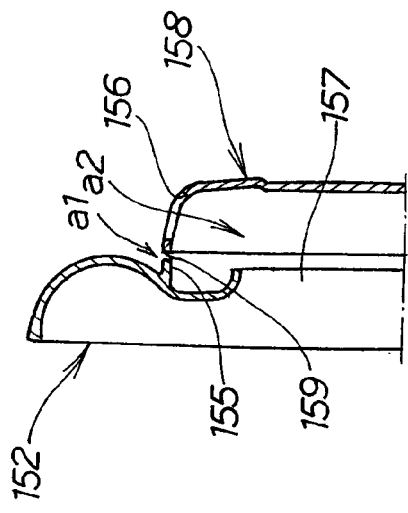
FIG. 7B
(COMP. EXA.)
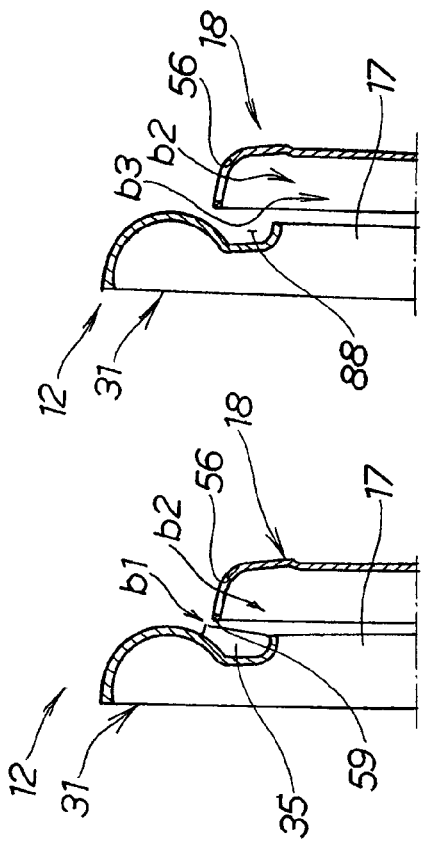
FIG. 7E
(EXA.)
FIG. 7D
(EXA.)
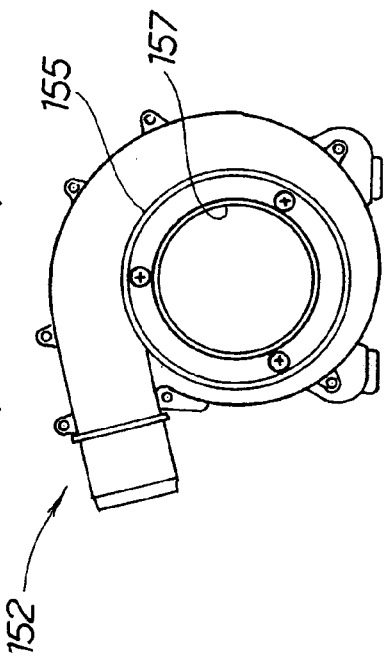
FIG. 7A
(COMP. EXA.)
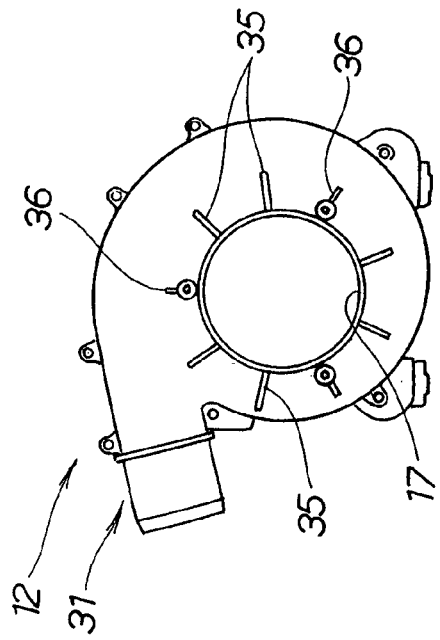
FIG. 7C
(EXA.)

(COMP. EXA.)

(COMP. EXA.)

(EXA.)

(EXA.)

# POWER BLOWER

FIELD OF THE INVENTION

The present invention relates to power blowers which can be used in various work postures according to working conditions.

BACKGROUND OF THE INVENTION

Power blowers which take in air from the rear of a housing containing a fan or from the side of the housing, and discharge air forward of the housing are in practical use.

As a power blower of this kind, a hand-held power blower is known as disclosed in Japanese Utility Model Laid-Open Publication No. HEI-02-120511, for example. The configuration of this hand-held power blower will be described with reference to FIG. 12 hereof.

Referring to FIG. 12, a hand-held blower, or a power blower 210 includes a fan housing 212 in which a fan 213 is contained. An upper grip (main handle) 214 is provided on top of the fan housing 212, and a rear grip (auxiliary handle) 215 is provided at the rear. A discharge duct 216 for discharging air forward of the fan housing 212 is provided at the front of the fan housing 212. A plurality of legs (stands) 217, 217 for keeping a body 211 in a freestanding position is provided at the bottom of the fan housing 212. With the upper grip 214 gripped with one hand, and the rear grip 215 gripped with the other hand, the power blower 210 is operated for blowing fallen leaves together, for example.

This power blower 210 is a portable operating machine supported with both hands as described above. If the body 211 could be turned horizontally to be manually held, for example, as well as the body 211 being able to be manually held normally, various operations could be preferably performed according to working conditions.

The above-described power blower 210, however, has the configuration in which the upper grip 214 and the rear grip 215 are attached to the fan housing 202, and thus the power blower 210 cannot be manually held in a sideways position. That is, it has the problem that the work posture is limited.

Therefore, there is a desire for a power blower which can perform operations with a body in a normal position, or with the body in a horizontal position, according to working conditions.

SUMMARY OF THE INVENTION

According to the present invention, there is provided a power blower, which comprises: a fan housing for containing a fan, constituting a part of a body; a driving machine mounted to the fan housing, for driving the fan; a discharge duct mounted to the fan housing, for sending out a current of air produced by driving of the fan; a pair of legs provided at the housing, for allowing the body an upper portion of the fan housing in a position opposite to a position in which the pair of legs is provided; and an auxiliary handle integrally formed with and between the pair of legs.

As described above, the power blower of this invention has the auxiliary handle formed between the pair of legs, thus being able to be held with both hands in such a manner that the auxiliary handle is held with one hand and the main handle is held with the other hand. Also, since the auxiliary handle is integrally formed with and between the pair of legs, the auxiliary handle can be provided easily. Further, since the main handle and the auxiliary handle are provided in opposite positions, operations can be done with the body turned horizontally depending on working conditions, resulting in an increased variety of operations.

The auxiliary handle is preferably formed in a position on a general extension line of the main handle. Consequently, when operations are done with the body turned sideways, the body can be supported horizontally, resulting in increased operating efficiency.

BRIEF DESCRIPTION OF THE DRAWINGS

Preferred embodiments of the present invention will be described in detail below, by way of example only, with reference to the accompanying drawings, in which:

FIG. 5 is a side view of a left fan housing shown in FIG. 3;

FIG. 6 is a cross-sectional view taken along line 6-6 in FIG. 5;

FIGS. 7A to 7E are diagrams illustrating power blowers in a comparative example and in an embodiment;

DETAILED DESCRIPTION OF THE PREFERRED EMBODIMENTS

Figure 1:
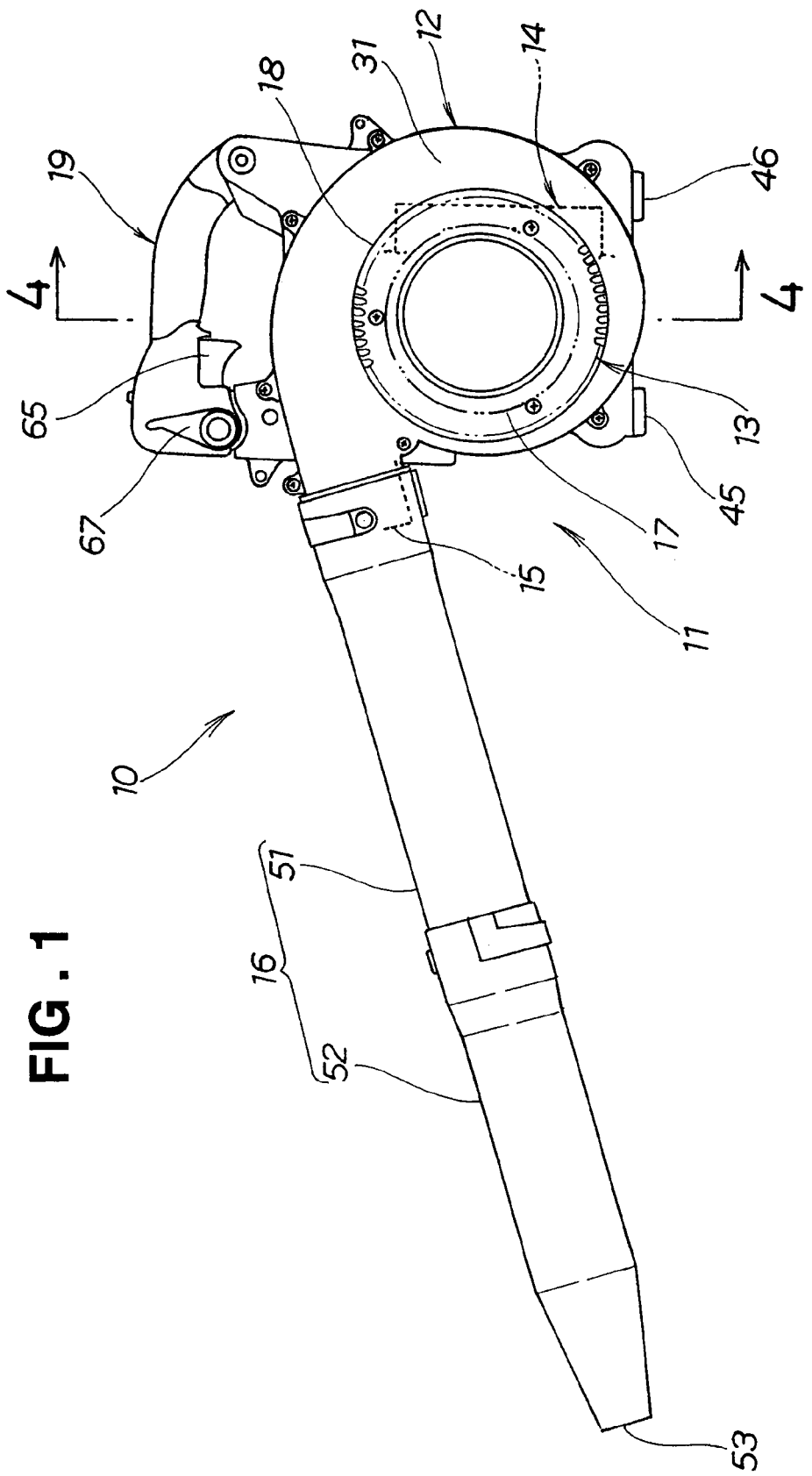
FIG. 1 is a left side view of a power blower according to the present invention.
Figure 2:
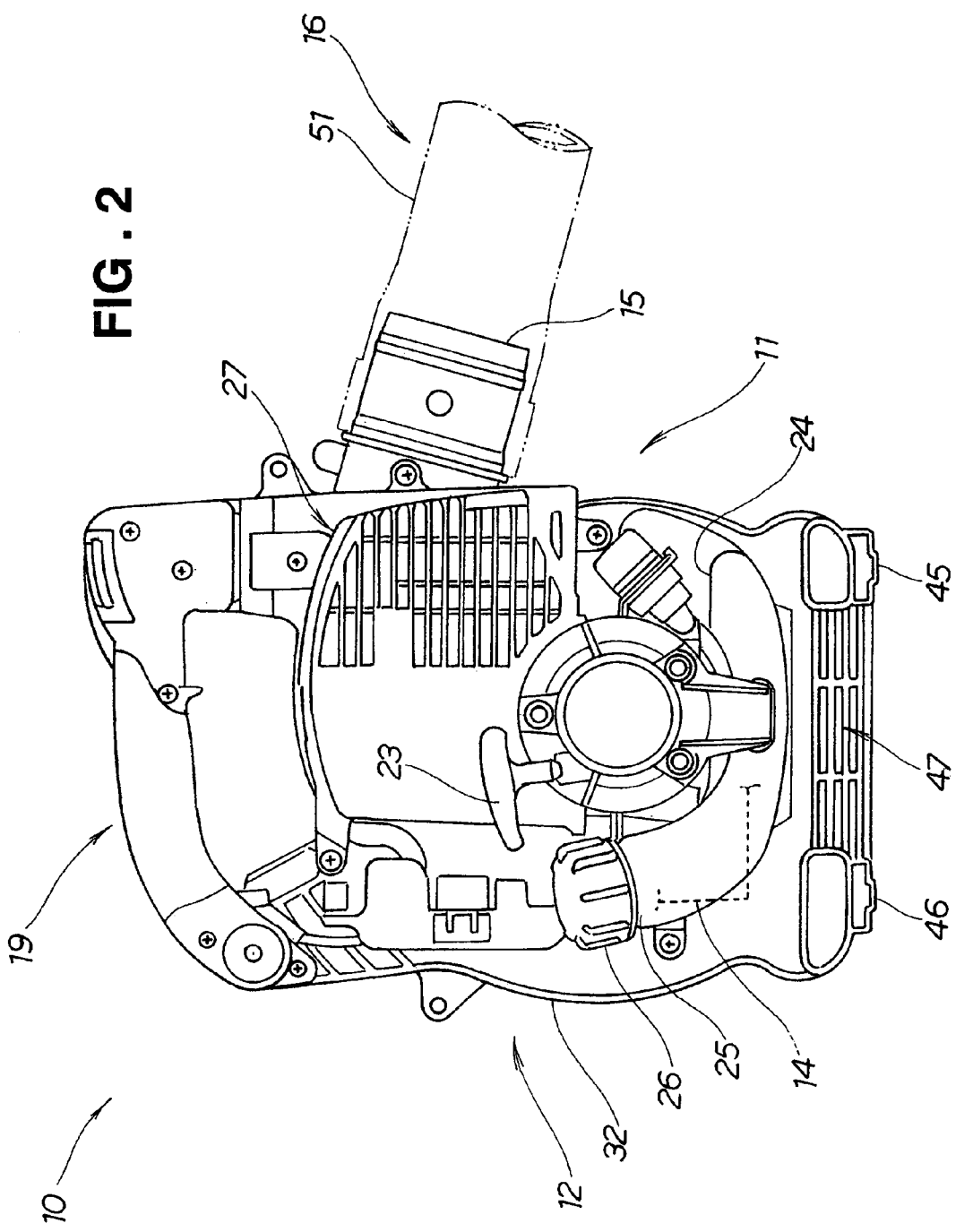
FIG. 2 is a right side view of a body of the power blower shown in FIG. 1.

Referring to FIGS. 1 and 2, a power blower 10 illustrated in this embodiment is of a portable type. This power blower 10 includes a fan housing 12 containing a fan 13, and a motor 14 externally mounted to the fan housing 12 for driving the fan 13. A discharge duct 16 for discharging air from the fan housing 12 is mounted to a discharge opening 15 formed in the fan housing 12. A fan shroud 18 is mounted to a suction opening 17 formed in the fan housing 12. A main handle 19 is mounted to an upper portion of the fan housing 12.

A body 11 of the power blower 10 is comprised of the fan housing 12, the fan shroud 18 and the main handle 19.

As shown in FIG. 2, the motor 14 is a general-purpose engine including a recoil starter knob 23 used for starting the motor 14, a fuel tank 24 storing fuel to be supplied to the motor 14, a cap 26 put on a filler opening 25 of the fuel tank 24, and a motor cover 27 covering the motor 14.

The power blower 10 according to this embodiment will be described in more detail with reference to FIG. 3 of an exploded perspective view.

Figure 3:
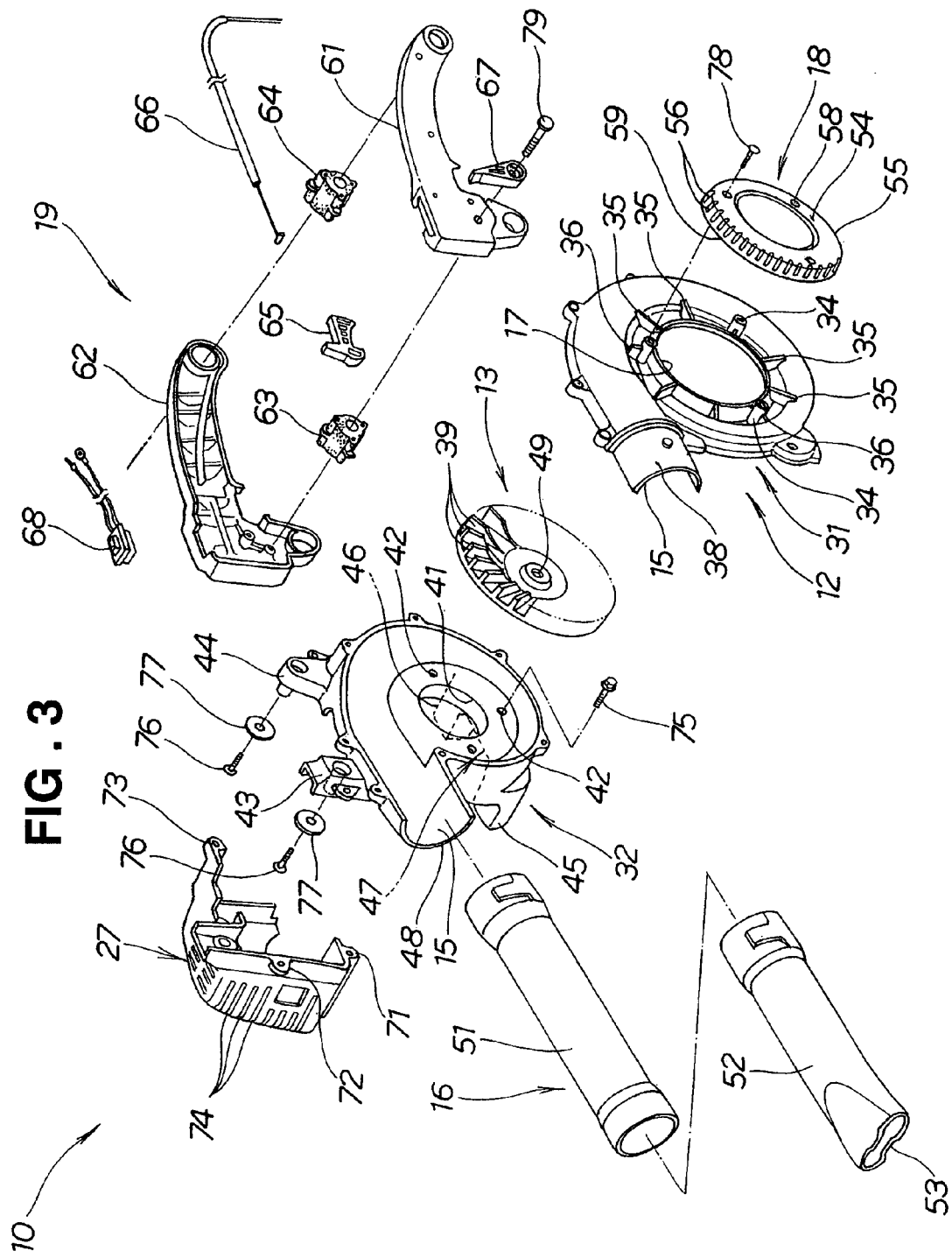
FIG. 3 is an exploded perspective view of the power blower shown in FIG. 1.

Referring to FIG. 3, the fan housing 12 includes a first fan housing portion (hereinafter referred to as a left fan housing) 31 to which the fan shroud 18 is mounted and a second fan housing portion (hereinafter referred to as a right fan housing) 32 to which the motor 14 (see FIG. 1) is mounted.

The left fan housing 31 has the suction opening 17 through which air is drawn from outside into the fan housing 12. The fan shroud 18 is secured to a plurality of bosses 34 provided at the left fan housing 31. The left fan housing 31 includes a plurality of stiffening ribs 35, 36, and a left discharge opening portion 38 forming half of the discharge opening 15.

The stiffening ribs 35 are formed at the left fan housing 31 in such a manner as to extend outside of the periphery of the fan shroud 18. The stiffening ribs 36 are formed at their respective bosses 34 formed at the fan housing 31, opposite to the periphery of the fan shroud 18.

The right fan housing 32 includes an insertion opening 41 to which the motor 14 (see FIG. 1) is opposed, a plurality of mounting portions 42 to which the motor 14 is mounted, front and rear supports 43, 44 for supporting the main handle 19, legs (stands) 45, 46 for allowing the body 11 (see FIG. 1) to stand alone, an auxiliary handle 47 integrally formed with and between the legs 45, 46, and a right discharge opening portion 48 forming half of the discharge opening 15.

The fan 13 consists of an axial portion 49 to be mounted to the motor 14 (see FIG. 1), and a plurality of vanes 39 formed radially around the axial portion 49.

The discharge opening 15 is formed by combining the left discharge opening portion 38 to the right discharge opening portion 48.

The discharge duct 16 consists of a rear duct 51 attached to the discharge opening 15, and a front duct 52 attached to the front end of the rear duct 51. The front duct 52 has a blast opening 53 formed in a tapered front end portion.

The fan shroud 18 is in a tray-like shape. The fan shroud 18 consists of a body (base) 54 and a side portion 55 raised from the base 54 in a radially outwardly inclined manner. The side portion 55 includes a plurality of slits 56 formed in its periphery at equal intervals. The base 54 includes screw-fitting portions 58.

Reference numeral 59 denotes a peripheral edge of the fan shroud 18. The slits 56 are only formed in the side portion 55, so as to prevent the fan shroud 18 from absorbing an operator's clothes during cleaning operation, for example.

The main handle 19 is comprised of a first handle portion (hereinafter referred to as left handle half) 61, a second handle portion (hereinafter referred to as right handle half) 62 combined to the left handle half 61, rubber vibration isolators 63, 64 interposed between the left and right handle halves 61, 62, a throttle lever 65 swingably mounted to the left and right handle halves 61, 62, a throttle wire 66 connected to the throttle lever 65, a throttle holding lever 67 mounted to the left and right handle halves 61, 62 to hold the throttle lever 65 in a desired position, and a starting switch 68 mounted to the left and right handle halves 61, 62, for turning the motor 14 (see FIG. 1) into ready condition or halt condition.

The motor cover 27 includes a plurality of flanges 71, 72, 73 to be attached to the right fan housing 32, and a plurality of vents 74.

The motor 14 (see FIG. 4) is mounted to the right fan housing 32 by mounting screws 75. The main handle 19 is mounted to the front and rear supports 43, 44 formed on an upper surface of the right fan housing 32 by mounting screws 76, 76 with washers 77, 77 therebetween. The fan shroud 18 is mounted to the left fan housing 31 by mounting screws 78. The throttle holding lever 67 is mounted to the left and right handle halves 61, 62 by a mounting screw 79.

Figure 4:
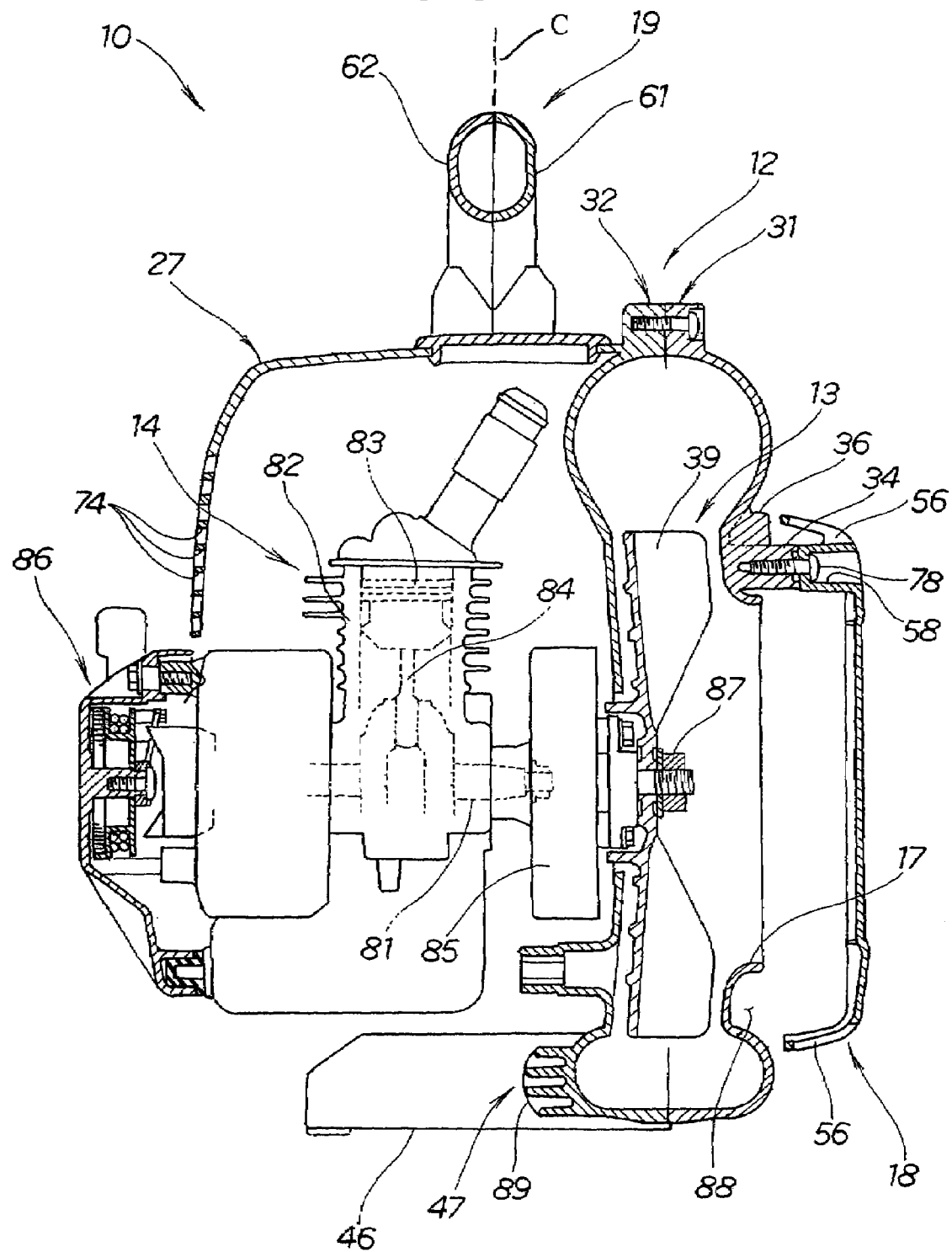
FIG. 4 is a cross-sectional view taken along line 4-4 in FIG. 1.

As shown in FIG. 4, the motor 14 is externally mounted to the right fan housing 32, for example, to abut on one side of the fan housing 12. The motor cover 27 covers the motor 14. One end of a crankshaft 81 of the motor 14 is fitted to the fan 13 provided inside of the right fan housing 32. The fan 13 is contained within the fan housing 12 by attaching the left fan housing 31 to the right fan housing 32.

The fan shroud 18 is mounted to the suction opening 17 side of the left fan housing 31 by the mounting screws 78.

The auxiliary handle 47 is provided on the general extension line of the main handle 19, connecting the legs 45, 46 as shown in FIG. 2.

In FIG. 4, reference numeral 82 denotes a cylinder of the motor 14; 83, a piston; 84, a connecting rod; 85, a fan support disc mounted on the one end of the crankshaft 81; 86, a recoil starter mounted to the other end of the crankshaft 81; 87, a nut for securing the fan 13 to the fan support disc 85; and 88, a space for taking air into the fan housing 12 as will be described below.

The auxiliary handle 47 is formed in a position on the general extension line of the main handle 19 as described above, so that the body 11 can be laterally turned into a horizontal position for operation.

Since the right fan housing 32 is a housing supporting the motor 14, the legs 45, 46 (see FIG. 2) are provided at the right fan housing 32, thereby allowing the body 11 (see FIG. 1) to stably stand on its own.

The auxiliary handle 47 has an edge 89 (holding edge) that is rounded, thereby facilitating holding the auxiliary handle 47 and supporting the body 11.

FIG. 5 illustrates the left fan housing 31 when viewed from the side. The stiffening ribs 35, 36 are formed radially around the peripheral edge of the suction opening 17, for reinforcing the peripheral edge of the suction opening 17. The stiffening ribs 35 extend in such a manner that their respective distal ends project slightly outside of the peripheral edge 59 of the fan shroud 18. The stiffening ribs 36 are formed at the bosses 34 in such a manner that their respective distal ends substantially coincide with the peripheral edge 59 of the fan shroud 18.

The stiffening ribs 35, 36 are radially formed around the suction opening 17, for reinforcing the suction opening 17, and the peripheral edge 59 of the fan shroud 18 is opposite to or abuts on the stiffening ribs 35, 36. This arrangement is preferable because the fan shroud 18 can be easily prevented from deformation and breakage, and the weight increase of the power blower 10 (see FIG. 1) can be kept to a minimum.

Also, by radially forming the stiffening ribs 35, 36 around the suction opening 17 for reinforcing the suction opening 17, space can be provided between the adjacent stiffening ribs 35 and the adjacent stiffening ribs 36, through which space air can be drawn into the suction opening 17. As a result, the air suction amount can be effectively increased, resulting in improved blowing performance of the power blower 10 (see FIG. 1).

As shown in FIG. 6, the stiffening ribs 35 are formed in such a manner that their respective distal ends project outside of the peripheral edge 59 of the fan shroud 18, thereby being able to receive a deforming external force acting on the fan shroud 18, preventing deformation and breakage of the fan shroud 18.

FIGS. 7A to 7E illustrate power blowers in a comparative example and in this embodiment; FIGS. 7A and 7B illustrate a fan housing 152 and a fan shroud 158 in the comparative example; and FIGS. 7C to 7E illustrate the fan housing 12 and the fan shroud 18 in this embodiment.

The fan housing 152 in the comparative example shown in FIG. 7A shows an example in which a stiffening rib 155 having a diameter larger than the diameter of a suction opening 157 is cylindrically formed around the suction opening 157. Therefore, as shown in FIG. 7B, air is drawn into the suction opening 157 through a gap between an edge 159 of the fan shroud 158 and the stiffening rib 155 as shown by arrow a1, and also through an opening 156 in the fan shroud 158 as shown by arrow a2.

The fan housing 12 in this embodiment shown in FIG. 7C has the stiffening ribs 35 and the stiffening ribs 36 formed radially around the suction opening 17 for reinforcing the suction opening 17. Therefore, as shown in FIG. 7D, air is drawn into the suction opening 17 through a gap between the edge 59 of the fan shroud 18 and the stiffening rib 35 as shown by arrow b1, and also through the opening 56 in the fan shroud 18 as shown by arrow b2.

As shown in FIG. 7C, the adjacent stiffening ribs 35, 35 are placed at intervals to form space therebetween, so that, as shown in FIG. 7E, air is drawn into the suction opening 17 through the space 88 as shown by arrow b3. Consequently, the air suction amount (the opening area) can be effectively increased, and the blowing performance of the power blower 10 (see FIG. 1) is improved.

Figure 8:
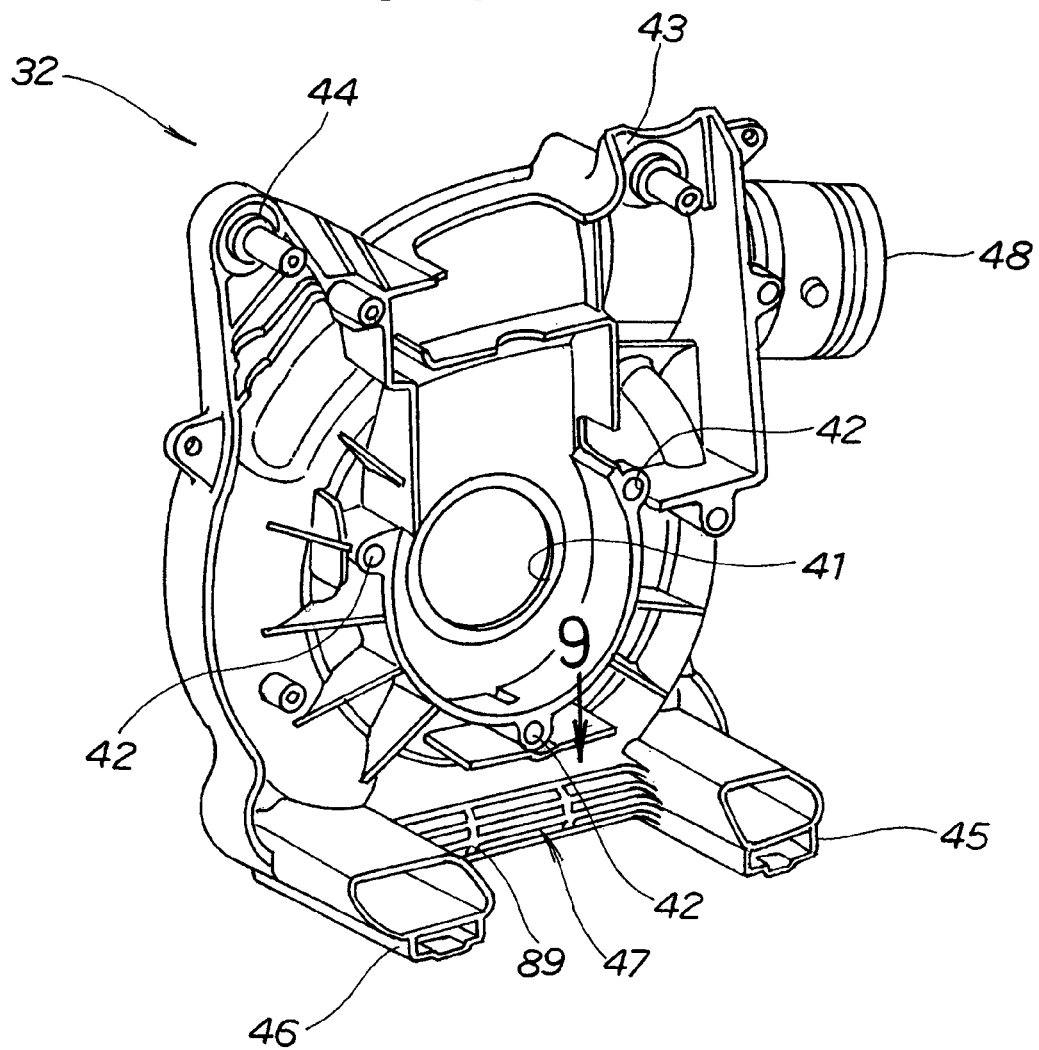
FIG. 8 is a perspective view of a right fan housing shown in FIG. 3.
Figure 9:
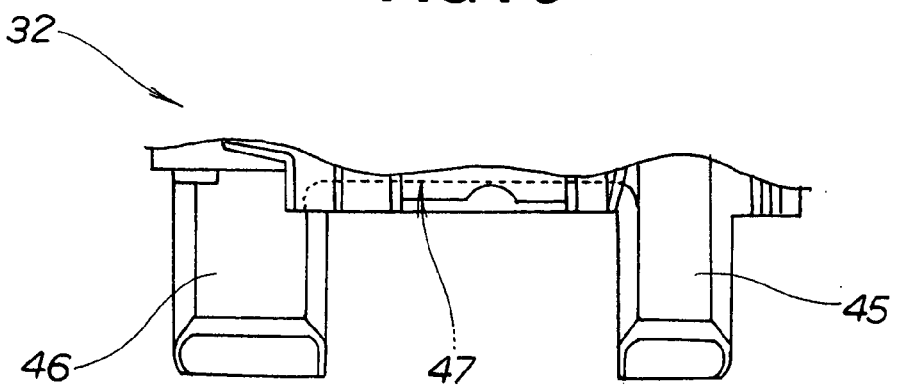
FIG. 9 is a view taken in the direction or arrow 9 in FIG. 8.

FIGS. 8 and 9 illustrate the right fan housing 32 of the power blower 10 according to this embodiment.

As described above, the right fan housing 32 includes the insertion opening 41 to be opposite to the motor 14 shown in FIG. 1, the mounting portions 42 to which the motor 14 is mounted, the front and rear supports 43, 44 for supporting the main handle 19 shown in FIG. 1, the legs 45, 46 for allowing the body 11 to stand alone, the auxiliary handle 47 integrally formed with and between the legs 45, 46, and the right discharge opening portion 48 for forming half of the discharge opening 15 shown in FIG. 1.

The power blower 10 shown in FIG. 1 is configured such that the main handle 19 (see FIG. 1) is provided on top of the fan housing 12 for portability, and the auxiliary handle 47 is integrally formed with and between the pair of legs 45, 46. Therefore, the fan housing 12 can be held with both hands, with one hand holding the auxiliary handle 47 and the other hand holding the main handle 19. If operations can be done with the blower body turned into a horizontal position according to working conditions, the variety of operations can be preferably increased.

Figure 12:
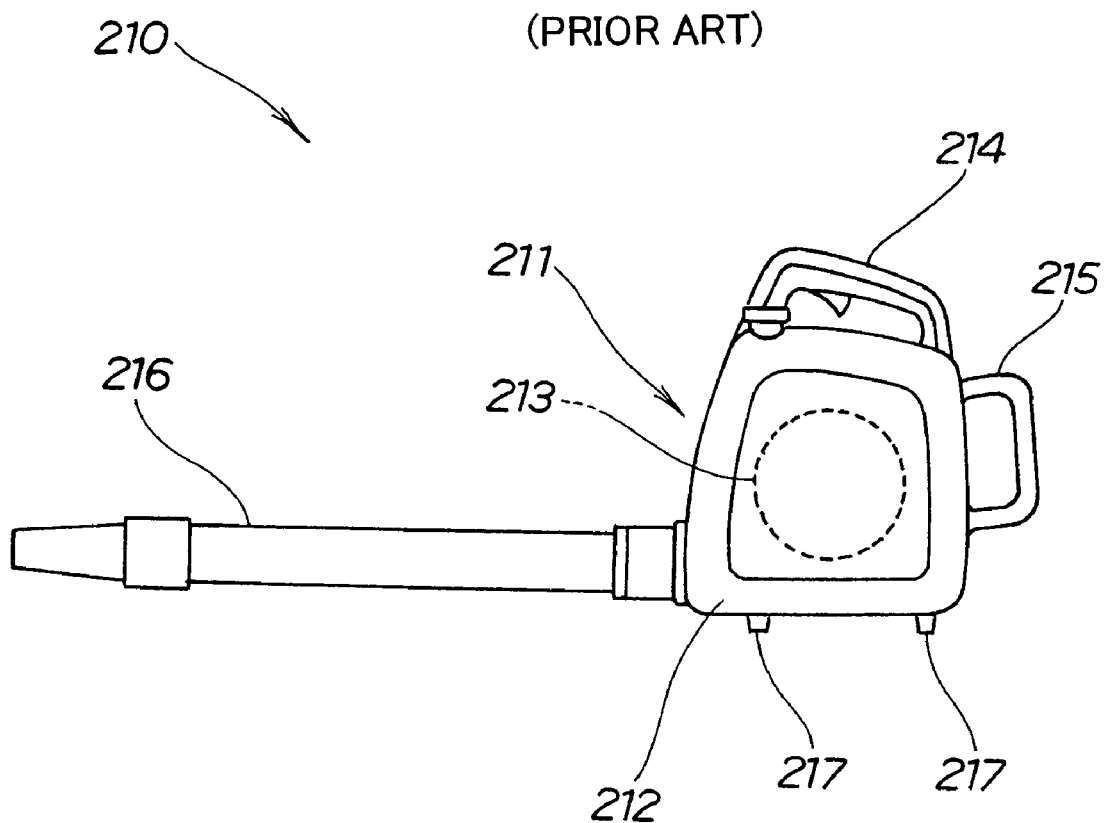
FIG. 12 is a diagram illustrating a conventional hand-held blower.

The conventional power blower 210 shown in FIG. 12 is configured such that the upper handle 214, the rear handle 215, and the legs 217 are provided in different positions at the fan housing 212. Thus, the form of the fan housing 202 is complicated, and the production of the fan housing 202 is disadvantageously difficult.

On the other hand, the power blower 10 in this embodiment is configured such that the auxiliary handle 47 is integrally formed with and between the pair of legs 45, 46. Thus, the form of the fan housing 12 is simple, and the cost increase of the power blower 10 can be kept to a minimum.

Figure 10A:
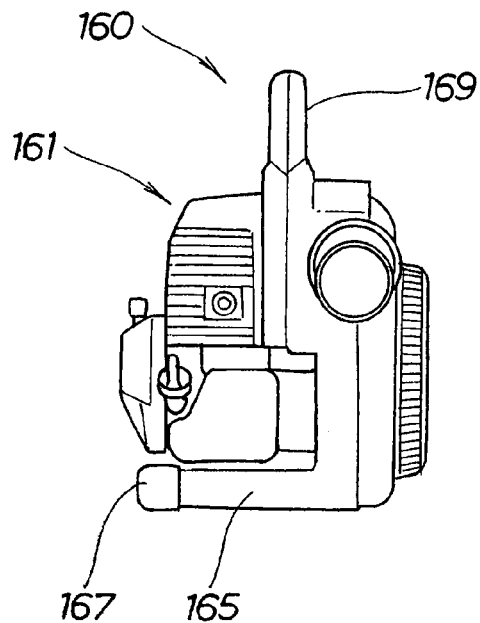
FIGS. 10A to 10D are diagrams illustrating supported positions of power blowers in a comparative example and in an embodiment.
Figure 10B:
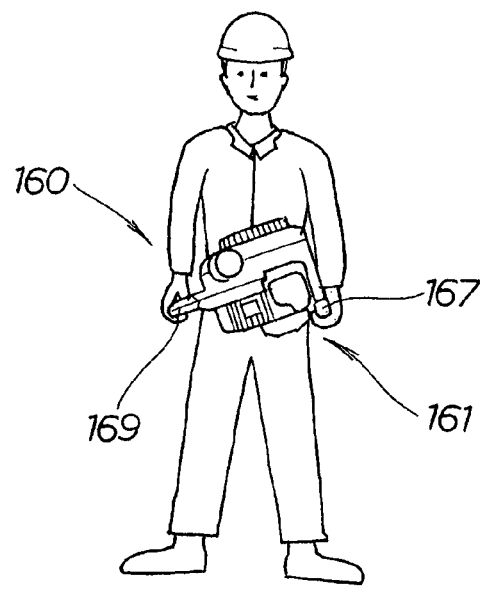
Figure 10C:
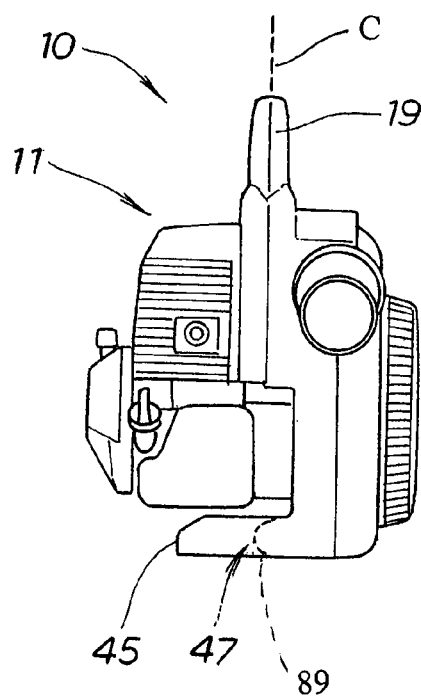
Figure 10D:
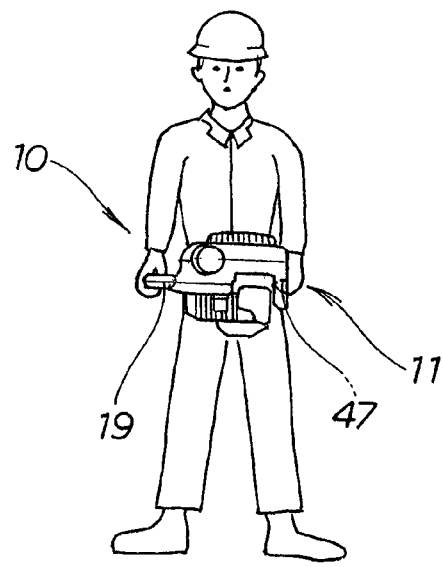

FIGS. 10A to 10D illustrate in comparison supported positions of a power blower 160 in a comparative example and the power blower 10 in this embodiment; FIGS. 10A and 10B illustrate the power blower 160 in the comparative example; and FIGS. 10C and 10D illustrate the power blower 10 in this embodiment.

The power blower 160 in the comparative example shown in FIG. 10A has the configuration in which a main handle 169 is provided on a body 161, and a separate auxiliary handle 167 is mounted between legs 165, 165 (the back leg 165 not shown) of the body 161. An additional part is required to provide the auxiliary handle 167 between the legs 165, 165, resulting in a corresponding cost increase. The edge of the auxiliary handle 167 is not on the extension line of the main handle 169, and is out of alignment with the position of the main handle 169. Therefore, as shown in FIG. 10B, when the auxiliary handle 167 is held with one hand and the main handle 169 is held with the other hand for using the body 161 in a sideways position, the body 161 is inevitably inclined.

On the other hand, the power blower 10 in this embodiment shown in FIG. 10C has the auxiliary handle 47 integrally formed with and between the pair of legs 45, 46 (the back leg 46 not shown), the edge 89 of the auxiliary handle 47 being substantially on the central extension line c of the main handle 19. This arrangement allows a reduction in cost, and also, as shown in FIG. 10D, allows operations with the body 11 turned sideways, to be performed with the body 11 in a horizontal position, facilitating the manipulation of the power blower 10 in a stable position.

Figure 11:
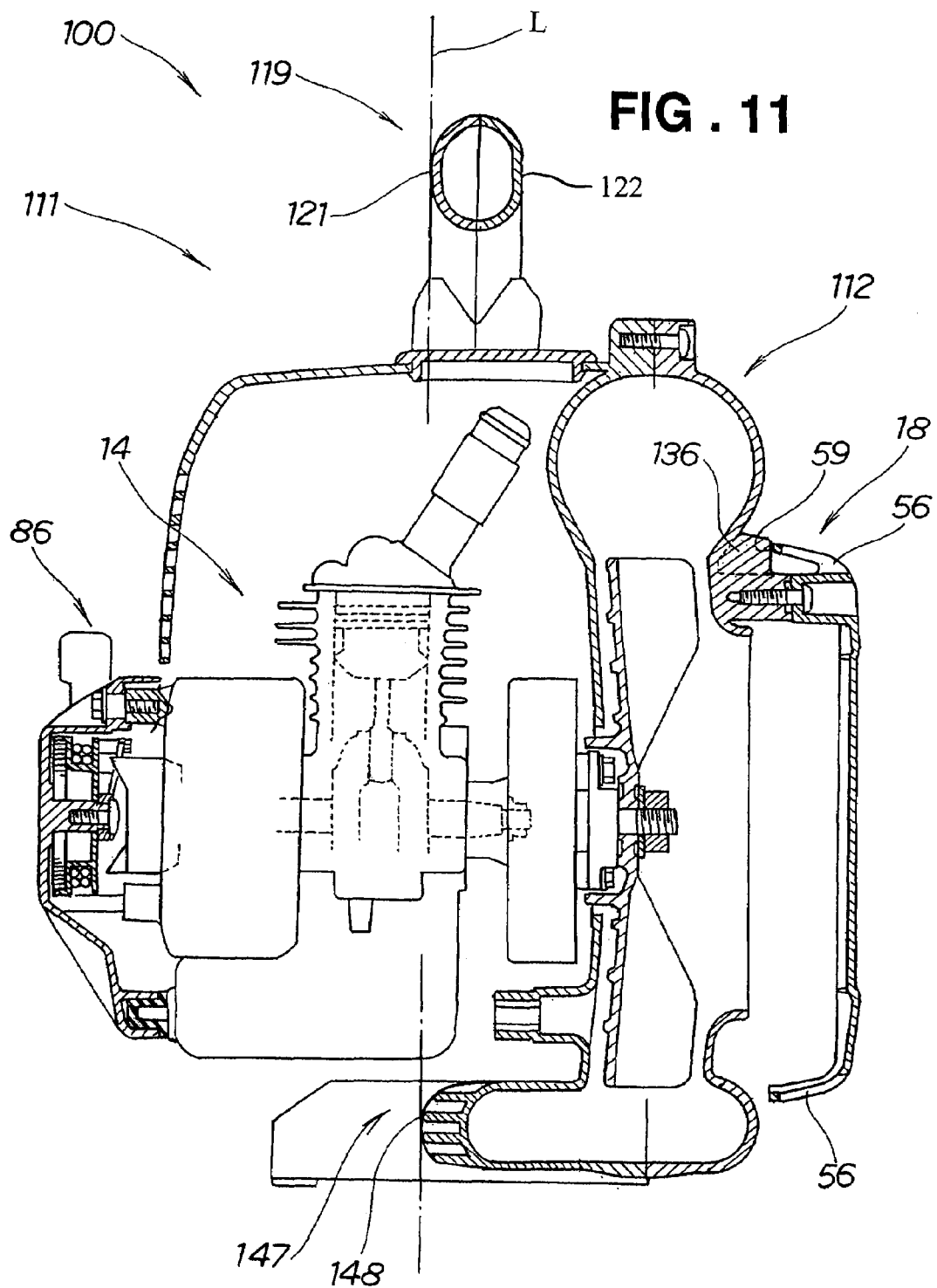
FIG. 11 is a cross-sectional view of a modification of the power blower shown in FIG. 4.

FIG. 11 illustrates a modification of the power blower 10 shown in FIG. 4.

A power blower 100 in this modification is configured substantially the same as the power blower 10 shown in FIG. 4. A fan shroud 18 is mounted to a fan housing 112 in such a manner that a peripheral edge 59 of the fan shroud 18 abuts on stiffening ribs 136 of the fan housing 112, which is a difference from the power blower 10 in the embodiment shown in FIG. 4. Even when a small force acts on the fan shroud 18, the fan shroud 18 is complemented in rigidity by the stiffening ribs 136.

The power blower 100 in this modification is also different from the power blower 10 in the embodiment shown in FIG. 4 in another way. More specifically, an edge 148 of an auxiliary handle 147 is aligned with the right side 121 of the main handle 119. Stated otherwise, the edge 148 of the auxiliary handle 147 is substantially on a line L extending along the right side 121 of the main handle 119. When a body 111 is laterally turned over to be supported, the body 111 can be supported horizontally.

The power blower 10 in this embodiment shows that the distal ends of the stiffening ribs 36 are formed in coincidence with the periphery of the fan shroud 18 as shown in FIG. 5, but the present invention is not limited thereto. They may be extended to project outside of the periphery of the fan shroud 18.

Obviously, various minor changes and modifications of the present invention are possible in the light of the above teaching. It is therefore to be understood that within the scope of the appended claims the invention may be practiced otherwise than as specifically described.

What is claimed is:

1. A power blower comprising:
    a body having a fan housing for accommodating a fan, the fan housing having an upper portion, a lower portion opposite to the upper portion, and a pair of support portions extending from the upper portion;
    a driving machine mounted to the fan housing for driving the fan;
    a discharge duct mounted to the fan housing for discharging a current of air produced by driving of the fan;
    a pair of legs for enabling the body to stand alone on a surface, the pair of legs being disposed at the lower portion of the fan housing;
    a main handle having a structure separate and independent from the fan housing and being removably connected to the pair of support portions of the fan housing; and
    an auxiliary handle integrally formed with and disposed between the pair of legs, the auxiliary handle having a holding edge aligned with a central extension line of the main handle.

2. A power blower comprising:
    a body having a fan housing for accommodating a fan, the fan housing having an upper portion, a lower portion opposite to the upper portion, and a pair of support portions extending from the upper portion;

a driving machine mounted to the fan housing for driving the fan;

a discharge duct mounted to the fan housing for discharging a current of air produced by driving of the fan;

a pair of legs for enabling the body to stand alone on a surface, the pair of legs being disposed at the lower portion of the fan housing;

a main handle having a structure separate and independent from the fan housing, the main handle being removably connected to the pair of support portions of the fan housing, the main handle having opposite external side surfaces; and an auxiliary handle integrally formed with and disposed between the pair of legs, the auxiliary handle having a holding edge aligned with one of the external side surfaces of the main handle.

3. A power blower comprising:

a body having a fan housing for accommodating a fan, the fan housing having an upper portion, a lower portion, and a pair of support portions extending from the upper portion;

a driving machine mounted to the fan housing for driving the fan;

a discharge duct mounted to the fan housing for discharging a current of air produced by driving of the fan;

a stand-alone structure disposed at the lower portion of the fan housing for enabling the body to stand alone on a surface;

a main handle having a structure separate and independent from the fan housing and being removably connected to the pair of support portions of the fan housing, the main handle having opposite external side surfaces; and an auxiliary handle having a holding edge and being disposed at the lower portion of the fan housing so that one of a central extension line of the main handle and a line extending along one of the external side surfaces of the main handle is substantially aligned with the holding edge of the auxiliary handle.

4. A power blower according to claim 3; wherein the auxiliary handle is formed integrally with the stand-alone structure.

5. A power blower according to claim 3; wherein the central extension line of the main handle is substantially aligned with the holding edge of the auxiliary handle.

6. A power blower according to claim 3; wherein the line extending along one of the external side surfaces of the main handle is substantially aligned with the holding edge of the auxiliary handle.

7. A power blower according to claim 1; wherein the fan housing has a first fan housing portion and a second fan housing portion removably connected to the first fan housing portion, the second fan housing portion having the pair of support portions.

8. A power blower according to claim 7; wherein the support portions are formed in one piece with the second fan housing portion from a single piece of material.

9. A power blower according to claim 1; wherein the main handle comprises a first handle portion, a second handle portion removably connected to the first handle portion, and a pair of vibration isolators interposed between the first and second handle portions.

10. A power blower according to claim 2; wherein the fan housing has a first fan housing portion and a second fan housing portion removably connected to the first fan housing portion, the second fan housing portion having the pair of support portions.

11. A power blower according to claim 10; wherein the support portions are formed in one piece with the second fan housing portion from a single piece of material.

12. A power blower according to claim 2; wherein the main handle comprises a first handle portion, a second handle portion removably connected to the first handle portion, and a pair of vibration isolators interposed between the first and second handle portions.

13. A power blower according to claim 3; wherein the fan housing has a first fan housing portion and a second fan housing portion removably connected to the first fan housing portion, the second fan housing portion having the pair of support portions.

14. A power blower according to claim 13; wherein the support portions are formed in one piece with the second fan housing portion from a single piece of material.

15. A power blower according to claim 3; wherein the main handle comprises a first handle portion, a second handle portion removably connected to the first handle portion, and a pair of vibration isolators interposed between the first and second handle portions.

* * * * *